United States Patent [19]

Gayer

[11] Patent Number: 4,539,000
[45] Date of Patent: Sep. 3, 1985

[54] METHOD OF MAKING BELT TENSIONING MEANS

[75] Inventor: Melvin D. Gayer, Rock Prairie Township, Dade County, Mo.

[73] Assignee: Dayco Corporation, Dayton, Ohio

[21] Appl. No.: 625,425

[22] Filed: Jun. 28, 1984

Related U.S. Application Data

[62] Division of Ser. No. 376,471, May 10, 1982, Pat. No. 4,478,594.

[51] Int. Cl.³ .............................................. F16H 11/06
[52] U.S. Cl. ......................................... 474/13; 474/11; 474/50
[58] Field of Search .................. 474/11, 13, 49, 50, 474/101

[56] References Cited

U.S. PATENT DOCUMENTS

| 1,857,324 | 5/1932 | Okumura | 474/50 |
| 3,090,488 | 5/1963 | Komline et al. | 474/54 X |
| 3,995,505 | 12/1976 | Luenberger | 474/13 X |
| 4,024,772 | 5/1977 | Kumm | 474/51 |
| 4,409,862 | 10/1983 | Adkins | 74/689 |
| 4,478,594 | 10/1984 | Gayer | 474/50 |

FOREIGN PATENT DOCUMENTS

| 1228081 | 8/1960 | France | 474/13 |
| 47-20294 | 9/1972 | Japan | 474/13 |

*Primary Examiner*—Leslie A. Braun
*Assistant Examiner*—Dwight G. Diehl
*Attorney, Agent, or Firm*—Joseph V. Tassone

[57] ABSTRACT

A method of making the combination of a power transmission belt that is to be operated in an endless path and a tensioner for the belt is provided, the tensioner comprising a support unit fixed relatively to the belt, a belt engaging unit carried by the support unit and being movable relative thereto, a biasing unit operatively associated with the support unit and the belt engaging unit urging the belt engaging unit relative to the support unit in a belt tensioning direction against the belt with a force to tension the belt, and a control unit operatively associated with the biasing unit to progressively decrease its urging force on the belt engaging unit as the speed of movement of the belt progressively increases from a certain low speed of movement thereof to a certain high speed of movement thereof.

10 Claims, 11 Drawing Figures

METHOD OF MAKING BELT TENSIONING MEANS

This is a division of Ser. No. 376,741, filed May 10, 1982; now, U.S. Pat. No. 4,478,594, issued Oct. 23, 1984.

BACKGROUND OF THE INVENTION

1. Field of the Invention

This invention relates to an improved combination of a power transmission belt that is adapted to be operated in an endless path and a tensioner for such belt as well as to the tensioner per se and to methods of making and operating such combination and the tensioner therefor.

2. Prior Art Statement

It is known in the art to provide a combination of a power transmission belt that is adapted to be operated in an endless path and a tensioner for the belt, the tensioner comprising a support means fixed relative to the belt, a belt engaging means carried by the support means and being movable relative thereto, and biasing means operatively associated with the support means and the belt engaging means urging the belt engaging means relative to the support means in a belt tensioning direction and against the belt with a force to tension the belt.

Examples of combinations of the above mentioned type are provided in the following five United States Patents:

(1) U.S. Pat. No. 3,413,866—Ford
(2) U.S. Pat. No. 4,108,013—Sragal
(3) U.S. Pat. No. 4,145,934—Sragal
(4) U.S. Pat. No. 4,151,756—Binder et al
(5) U.S. Pat. No. 4,249,425—Watson It appears from item (1) above that a tension spring urges an idler pulley in tensioning engagement against a belt.

It appears from item (2) above that a compression spring urges an idler pulley in tensioning engagement against a belt.

It appears from item (3) above that a leaf spring urges an idler pulley in tensioning engagement against a belt.

It appears from item (4) above that a plurality of bimetal dish-shaped springs or spring washers are disposed in various stacked relations thereof and urge an idler pulley in tensioning engagement against a belt.

It appears from item (5) above that pneumatic means is adapted to threadedly adjust an idler pulley rod of a belt tensioner wherein a pair of dish-shaped springs or spring washers urge the idler pulley in tensioning engagement against a belt.

It is also known to provide variable speed pulleys.

For example, see the following two United States Patents:

(6) U.S. Pat. No. 3,623,377—Lewis et al
(7) U.S. Pat. No. 4,024,772—Kumm

It appears that the variable speed pulley of item (6) above increases its effective diameter as the speed of rotation thereof increases, the pulley construction being adapted for operating on the opposed sides of a V-belt construction.

It appears that the variable speed pulley of item (7) above is adjustable under the force of a piston and cylinder arrangement and is adapted to operate on the bottom driving surface of a belt construction or on the opposed sides of a V-belt construction.

SUMMARY OF THE INVENTION

It is one feature of this invention to provide an improved combination of a power transmission belt that is adapted to be operated in an endless path and a tensioner for the belt.

In particular, it is believed according to the teachings of this invention that a belt tensioner can be provided that will progressively decrease its urging force on the power transmission belt as the speed of movement of the belt progressively increases from a certain low speed of movement thereof to a certain high speed of movement thereof. For example, such a combination can be utilized in an engine arrangement for an automobile wherein the endless power transmission belt drives a plurality of driven accessories and will provide increased belt tension at low speed/high load conditions of the engine to thereby prevent belt slippage and provide decreased tension at high speeds of the engine for improved flex life of the belt.

Therefore, one embodiment of this invention provides a combination of a power transmission belt that is adapted to be operated in an endless path and a tensioner for the belt, the tensioner comprising a support means fixed relative to the belt, a belt engaging means carried by the support means and being movable relative thereto, biasing means operatively associated with the support means and the belt engaging means urging the belt engaging means relative to the support means in a belt tensioning direction and against the belt with a force to tension the belt, and control means operatively associated with the biasing means to progressively decrease its urging force on the belt engaging means as the speed of movement of the belt progressively increases from a certain low speed of movement thereof to a certain high speed of movement thereof.

Accordingly, it is an object of this invention to provide an improved combination of a power transmission belt that is adapted to be operated in an endless path and a tensioner for the belt, the combination of this invention having one or more of the novel features of this inventions as set forth above or hereinafter shown or described.

Another object of this invention is to provide an improved method of operating the combination of a power transmission belt that is adapted to be moved in an endless path and a tensioner for the belt, the method of this invention having one or more of the novel features of this inventions set forth above or hereinafter shown or described.

Another object of this invention is to provide an improved method of making the combination of a power transmission belt that is adapted to be operated in an endless path and a tensioner for the belt, the method of this invention having one or more of the novel features of this invention as set forth above or herinafter shown or described.

Another object of this invention is to provide an improved tensioner for a power transmission belt that is adapted to be operated in an endless path, the tensioner of this invention having one or more of the novel features of this invention as set forth above or hereinafter shown or described.

Another object of this invention is to provide an improved method of making a tensioner for a power transmission belt that is adapted to be operated in an endless path, the method of this invention having one or more of the novel features of this invention as set forth above or hereinafter shown or described.

Other objects, uses, and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing a combination of a belt tensioner with a particular power transmission belt of a particular motor vehicle engine, it is to be understood that the various features of this invention can be utilized singly or in any combination thereof to provide an improved combination of a belt and a tensioner thereof for other arrangements as desired.

Therefore, this invention is not to be limited to only the embodiments illustrated in the drawings, because the drawings are merely utilized to illustrate one of the wide variety of uses of this invention.

Figure 1:
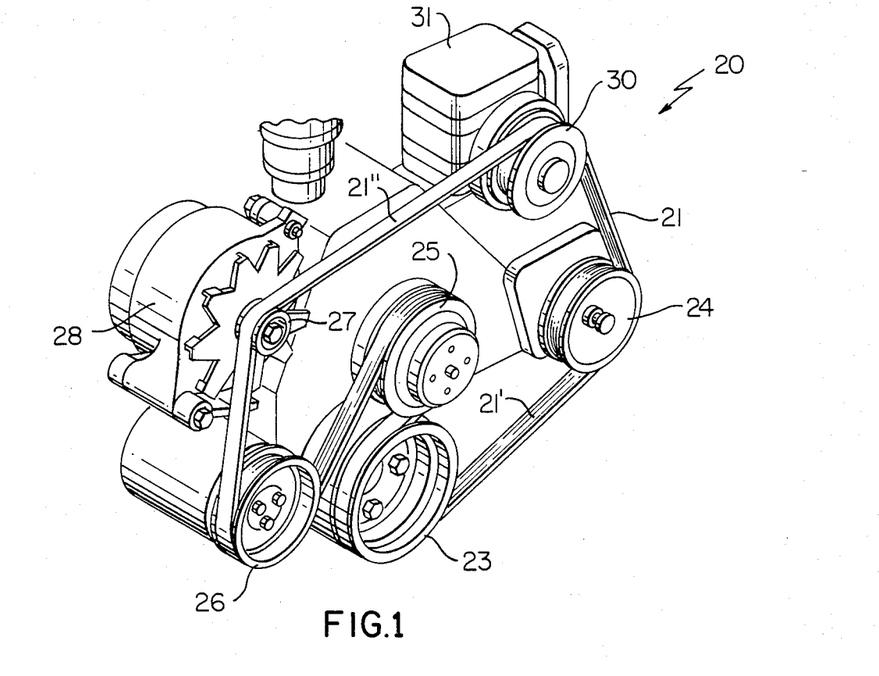
FIG. 1 is a fragmentary, isometric view looking toward the front end of an automotive engine which is adapted to utilize any one of the belt tensioners of this invention.
Figure 2:
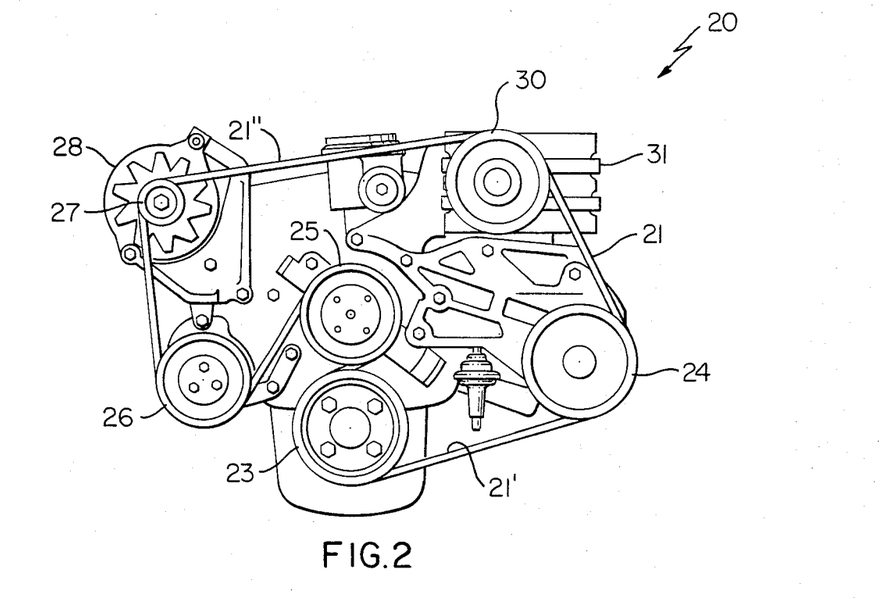
FIG. 2 is a view looking perpendicularly toward the front end of the automobile engine of FIG. 1.
Figure 3:
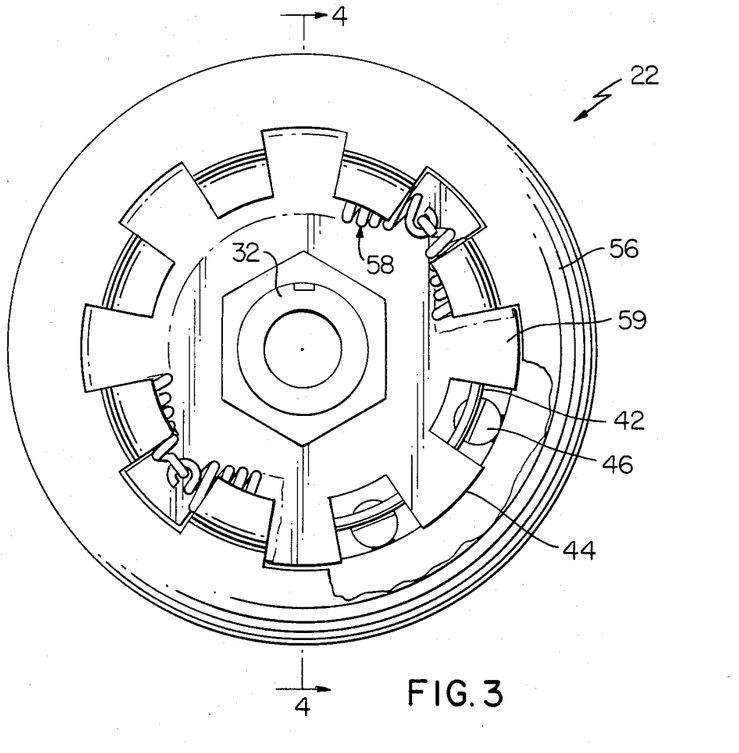
FIG. 3 is an enlarged end view of one embodiment of the belt tensioner of this invention, FIG. 3 being partially broken away.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 in FIGS. 3-6 and being adapted to be utilized to provide a tensioning force on the belt 21 in a manner hereinafter set forth whereby the combination of the belt 21 and the tensioner 22 forms one embodiment of the improved combination of this invention.

The endless power transmission belt 21 may be of any suitable type known in the art and is preferably made primarily of a polymeric material because the unique features of the tensioner 22 of this invention readily permit the tensioner 22 to tension a belt having a load-carrying cord formed of polyester, aramid or other suitable material and bottom driving surface 21' or top driving surface 21" in an efficient manner as hereinafter described.

The belt 21 is driven by a driving sheave or pulley 23 which is operatively interconnected to the crankshaft of the engine 20 in a manner well known in the art. The driving sheave 23 drives the belt 21 in an endless path and thereby drives a sheave or pulley 24 of a power steering device used in an automobile (not shown) utilizing the engine 20, a sheave or pulley 25 of an engine water pump, a sheave or pulley 26 of an air pump of a type used in an antipollution system for the engine 20, a sheave or pulley 27 of an engine electrical alternator 28, and a sheave or pulley 30 of a compressor 31 of an air conditioning system for the automobile utilizing the engine 20. All of the driven accessories, through their sheaves or pulleys 24, 25, 26, 27 and 30, impose a load on the belt 21 as is well known in the art.

As previously stated, it is one feature of this invention to provide relatively high belt tension force for the belt 21 at low speed/high load conditions of the engine 20 so as to thereby prevent belt slippage. However, at higher speeds of the engine 20 such high tension is believed not necessary and therefore it is believed that if the tension force could be reduced at high speeds of the engine 20, the belt 21 would have improved flex life.

Therefore, it is believed that the belt tensioner 22 of this invention can comprise a variable speed pulley that has its effective diameter progressively decrease as the speed of rotation thereof progressively increases from a relatively low speed of rotation thereof to a relatively high speed of rotation thereof and that such a variable pulley can be utilized to provide the belt tension for the belt 21 in a manner hereinafter set forth for the above purpose.

In particular, it is believed that the belt tensioner 22 of this invention can be utilized in place of any of the pulleys 23, 24, 25, 26, 27 or 30 for the engine 20 illustrated in FIGS. 1 and 2 to not only be either driven by the engine 20 as in the case of the pulley 23 or be driven by the belt 21 as is the case for the pulleys 24, 25, 26, 27 and 30, but also to provide a tensioner for the belt 21 so that at low speeds of the engine 20, and, thus, at low speeds of movement of the belt 21, the effective diameter of the pulley 22 would be relatively large to impose a high tension on the belt 21 and at high speeds of the engine 20, and, thus, at high speeds of movement of the belt 21, the effective diameter of the pulley 22 would be relatively smaller so as to place less tension on the belt 21 as will be apparent hereinafter.

As illustrated in FIGS. 3-6, the belt tensioner or pulley 22 of this invention has a support means 32 that comprises a hub having a shaft receiving opening 33 passing therethrough so as to permit the pulley 22 to be fixed to either a drive shaft of the engine 20 or a driven shaft of an accessory of the engine so that the support means 32 will be fixed relative to the belt 21 as will be apparent hereinafter.

The hub 32 has a pair of annular spaced apart flanges 34 and 35 which respectively have facing sides 36 and 37 defining a substantially rectangular belt receiving channel 38 therebetween, the belt 21 illustrated in FIGS. 4 and 6 being adapted to be received in the channel 38 and have its opposed side edges 39 and 40 respectively disposed closely adjacent the side faces 36 and 37 but permitting radial movement of the belt 21 therebetween as will be apparent hereinafter.

The tensioner or pulley 22 carries a belt engaging means 41 that is adapted to be urged into engagement with the driving surface 21' (or driving surface 21" such as in the case of pulley 22 being substituted for pulley 25 of FIGS. 1 and 2) of the belt 21 by a compression spring 42 disposed between the support means 32 and the belt engaging means 41 by having one end 43 thereof bearing against a plate 44 carried by the hub 32 and the other end 45 thereof bearing against cam members 46 which act on the belt engaging means 41 in a manner hereinafter set forth. In this manner, the urging force of the compression spring 42 imposes a tensioning force on the belt 21 through the belt engaging means 41.

The belt engaging means 41 comprises a plurality of cylindrical rods or members 47 each having angled opposed ends 48 and 49 with the end 48 thereof being received in a suitable opening 50 in the annular flange 34 and bearing against an angled end wall 51 thereof. The other end 49 of the respective rod 47 is received in an opening 52 that passes completely through the flange 35 and is disposed against an angular end 53 of a respective cam member 46 also received in that opening 52 as illustrated, each opening 52 defining a recess 54 in the annular flange 35 that has an angled wall 55 fo a purpose hereinafter described.

The cam members 46 are fixed to an annular cam plate 56 that has an annular cam surface 57 to be operated on by a centrifugal spring means 58 that is disposed between the side 59 of the plate 44 of the support means 32 and the cam surface 57 of the cam plate 56 in a manner similar to the variable speed pulley disclosed in the aforementioned U.S. Pat. No. 3,623,377 whereby such patent is being incorporated into this disclosure by this reference thereto for a detailed disclosure of the structure and operation of the centrifugal spring means 58.

Figure 4:
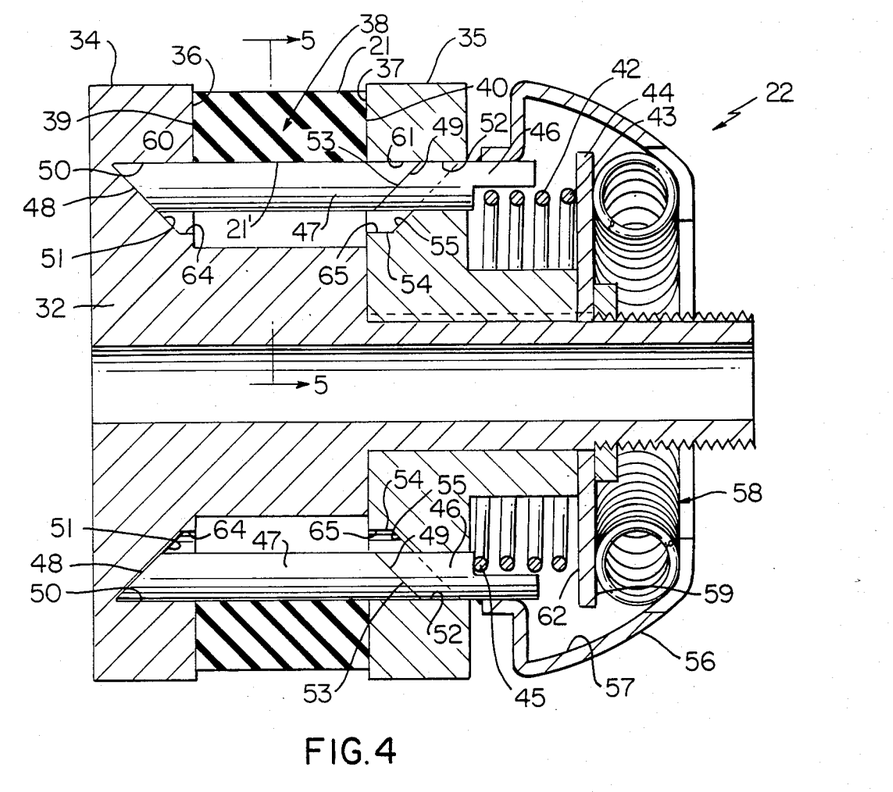
FIG. 4 is a cross-sectional view taken on line 4—4 of FIG. 3.
Figure 5:
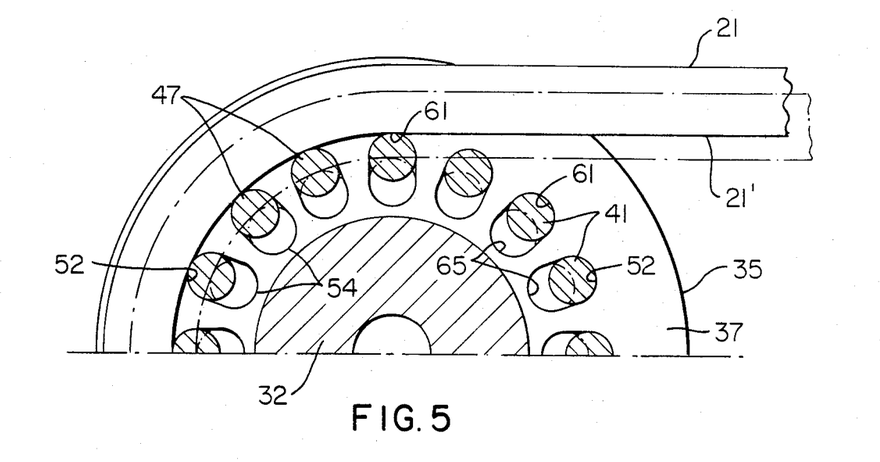
FIG. 5 is a fragmentary, cross-sectional view taken on line 5—5 of FIG. 4.

The force of the compression spring 42 is adapted to normally hold the pulley 22 in the maximum effective diameter condition illustrated in FIG. 4 wherein the cam members 46 are urged to the left to cam the belt engaging members 47 radially outwardly on the cam surfaces 55 thereof and the angled surfaces 48 of the annular flange 34 until the belt engaging members 47 are disposed against the upper surfaces 60 and 61 of the annular flanges 34 and 35 that are defined respectively by the openings 50 and 52. At this time, the centrifugal spring means 58 is at its smallest diameter as defined by the cam surface 57 having been moved to the left in FIG. 4 and the belt engaging means 44 is defining the largest effective diameter of the pulley 22.

Such cam action on the members 47 to cause movement thereof is generally described and illustrated in the aforementioned U.S. Pat. No. 4,024,772 whereby such patent is being incorporated into this disclosure by this reference thereto.

It can be seen that pulley 22 provides the greatest amount of tension on the belt 21 when the belt engaging means 41 is defining the largest effective diameter of the pulley 22 so that when the pulley 22 is utilized with the engine 20 for one of the sheaves 23, 24, 25, 26, 27 or 30 thereof as previously described, the pulley 22 at the lowest speed of movement of the belt 21 will provide the greatest tension on the belt 21 under the force of the compression spring 42.

However, as the speed of the engine 20 increases from a certain low speed of operation thereof, the speed of movement of the belt 21 increases and causes the rotation of the pulley 22 to increase whereby the rotating centrifugal means 58 begins to radially expand to act against the cam surface 57 of the cam plate 56 and tend to move the cam plate 56 to the right in opposition to the force of the compression spring 42. Thus, as the cam plate 56 moves to the right from the position illustrated in FIG. 4, it can be seen that the cam members 46 are pulled therewith and thereby permit the belt engaging members 47 to be moved radially inwardly by having the angled ends 48 thereof slide on the angled surface 51 of the annular flange 34 to follow the rightward movement of the cam members 46 whereby the effective diameter of the pulley 22 is reduced and thereby reduces the amount of tension that the pulley 22 is applying on the belt 21.

Figure 6:
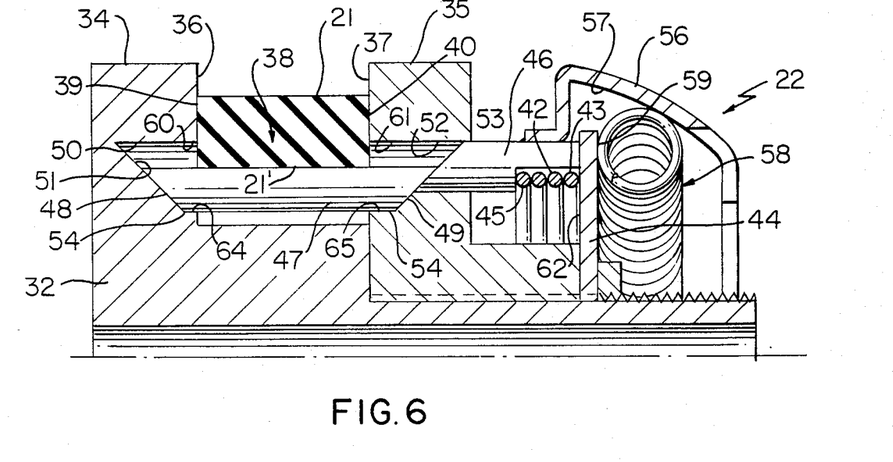
FIG. 6 is a partial view similar to FIG. 4 and illustrates the belt tensioner of FIG. 4 in another operating condition thereof.

At a certain high speed of movement of the belt 21, and, thus, at a certain high speed of rotation of the pulley 22, the centrifugal spring means 58 will have been expanded to the condition illustrated in FIG. 6 wherein the spring means 58 has moved the cam plate 56 to the right to its greatest extent where the cam members 46 abut against the side 62 of the plate 44 to prevent further rightward movement of the cam plate 56. At this time, the belt engaging members 47 have been moved radially inwardly to their greatest extent wherein the members 47 are disposed against the bottom surfaces 64 and 65 of the openings 50 and 54 of the annular flanges 34 and 35 of the support member 32 as illustrated whereby the pulley 22 is now providing the least amount of tension on the belt 21 as the pulley or tensioner 22 has its smallest effective diameter acting on the driving surface 21' (or 21") of the belt 21.

Accordingly, it is believed by selecting the proper force of the compression spring 42 and the proper force of the centrifugal spring means 58 for a particular engine 20, the tensioner 22 of this invention is believed to be adapted to provide the greatest amount of tension on the belt 21 at a certain slow speed of the engine 20, such as between zero to ten miles per hour of movement of the vehicle on a straight road, and then begin to progressively decrease that tension on the belt 21 as the speed of the vehicle increases from approximately ten miles per hour on the straight road to approximately fifty-five miles per hour on the straight road (present maximum allowable vehicle speed). At this time, the tensioner 22 will be providing the least amount of tension on the belt 21 as illustrated in FIG. 6. Of course, as the speed of the engine 20 progressively decreases, the tension force of the pulley 22 on the belt 21 will progressively increase in the reverse manner as previously described.

In this manner, it is believed that the tensioner 22 will provide the proper tension on the belt 21 to prevent slippage thereof during low speeds of operation of the engine 20 and will progressively decrease that tension on the belt 21 as the speed of the engine 20 increases so that the belt life of the belt 21 will be extended by the tensioner 22 of this invention.

Therefore, it can be seen that the tensioner 22 of this invention comprises a support means 32 adapted to be fixed relative to the belt 21, a belt engaging means 41 carried by the support means 32 and being movable relative thereto, biasing means 42 operatively associated with the support means 32 and the belt engaging means 41 urging the belt engaging means 41 relative to the support means 32 in a belt tensioning direction and against the belt 21 with a force to tension the belt 21, and control means 58 operatively associated with the biasing means 42 to progressively decrease its urging force on the belt engaging means 41 as the speed of movement of the belt 21 progressively increases from a certain low speed of movement thereof (FIG. 4) to a certain high speed of movement thereof (FIG. 6).

It is to be understood that while the amount of radial movement of the members 47 is illustrated in the drawings as being relatively large, such amount of movement is shown for purposes of understanding this invention whereas in actual practice of the invention, the amount of radial movement of the members 47 between the maximum effective diameter and minimum effective diameter may be relatively small. This fact also applies to the other tensioners of this invention.

While the belt 21 has been illustrated as having a flat inside surface 21' and a flat outside surface 21", it is to be understood that either surface 21' or 21" or both surfaces 21' and 21" could be ribbed wherein the ribs run longitudinally along the entire length of the belt and are substantially parallel to each other such as is well known in the art. For example, see the U.S. Pat. No. 3,839,116 for such a ribbed belt whereby this patent is being incorporated into this disclosure by this reference thereto to illustrate and describe a ribbed belt construction. Of course, it is to be understood that other types of endless power transmission belts can be utilized as desired. Therefore, while the tensioner 22 has been illustrated as having the members 47 thereof acting on the bottom surface 21' of the particular belt 21 being utilized with the tensioner 22, such surface may actually be the top surface 21" of the endless belt 21 rather than the bottom surface thereof. In addition, the members 47 could have flat surfaces and/or ribbed surfaces to correspond to the particular surface of the belt engaging against the same in either a driving or driven manner as the case may be.

In fact, suitable structures could be disposed intermediate the members 47 and the engaging surface of the belt being utilized with the tensioner 22.

Figure 11:
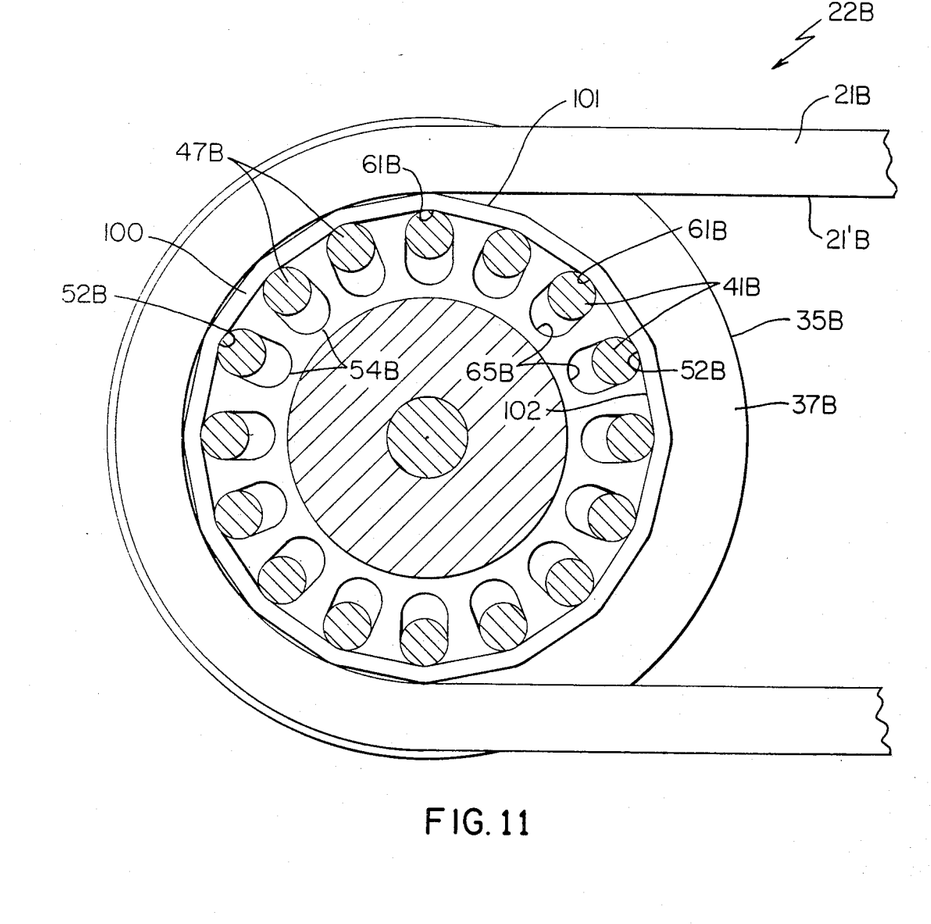
FIG. 11 is a view similar to FIG. 5 and illustrates another embodiment of the belt tensioner of this invention.

For example, reference is now made to FIG. 11 wherein another tensioner of this invention is generally indicated by the reference numeral 22B and parts thereof similar to the tensioner 22 previously described are indicated by like reference numerals followed by the reference letter "B".

As illustrated in FIG. 11, it can be seen that the tensioner 22B is substantially identical to the tensioner 22 previously described except that an endless flexible sleeve 100 is disposed completely about the belts engaging means 41B, comprising cylindrical rods or members 47B so as to have its outer surface 101 engaged by the surface 21'B (or 21"B) of the belt 21 and its inner surface 102 engaging the members 47B, the surfaces 101 and 102 of the sleeve 100 either being plain, ribbed, or suitably shaped as desired to correspond respectively to the surface 21B of the belt 21 and the surfaces of the members 47B so that the belt 21 can either be driven by the pulley 22B or drive the pulley 22B in substantially the same manner as the belt 21 previously described.

The sleeve 100 has a natural bias to tend to move the members 47B radially inwardly to their innermost position whereby the sleeve 100 will be expanded by the members 47B as the members 47B are disposed in their normal out position as illustrated in FIG. 11 by the spring 42B (not shown in FIG. 11) in the same manner as the spring 42 of the pulley 22 previously described. Of course, the spring 42B would be designed to compensate for the force of the sleeve 100 tending to move the members 47B radially inwardly.

In any event, it can be seen that the operation of the tensioner 22B is substantially the same as the tensioner 22 previously described and therefore the operation of the tensioner 22B need not be set forth.

While the sleeve 100 could be formed of any suitable material, the same could be formed of polymeric material and would provide the substantially arcuate form illustrated in FIG. 11 depending upon the amount of circumferential spacing between the members 47B.

While the tensioner 22 of this invention previously described has been illustrated and described as operating on the driving surface 21' or 21" or the belt 21, it is to be understood that the various features of this invention can be utilized to provide a tensioner for operation on other types of endless power transmission belts.

For example, another belt tensioner of this invention is generally indicated by the reference numeral 22A in FIGS. 7-10 and parts thereof similar to the tensioner 22 previously described are indicated by like reference numerals followed by the reference letter "A".

Figure 7:
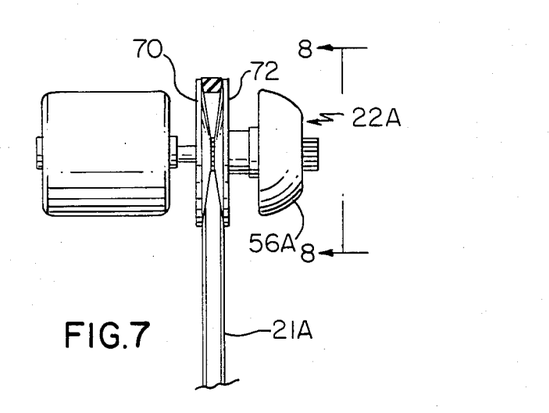
FIG. 7 is a schematic view illustrating another embodiment of the belt tensioner of this invention.
Figure 8:
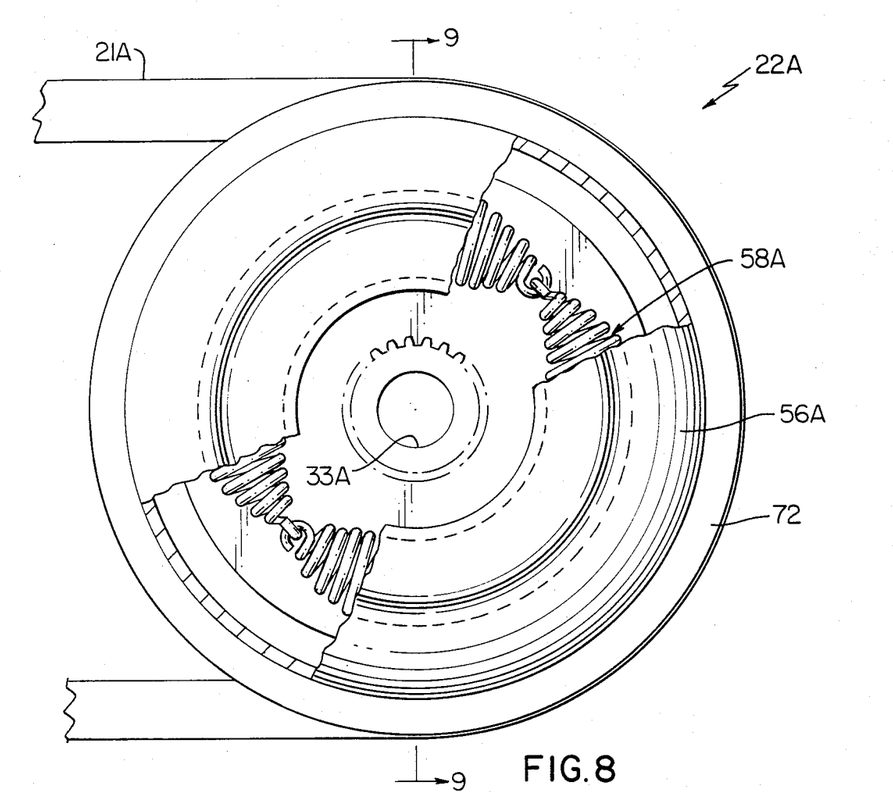
FIG. 8 is an enlarged fragmentary end view of the belt tensioner of FIG. 7 and is taken in the direction of the arrows 8—8 of FIG. 7, FIG. 8 being partially broken away.
Figure 9:
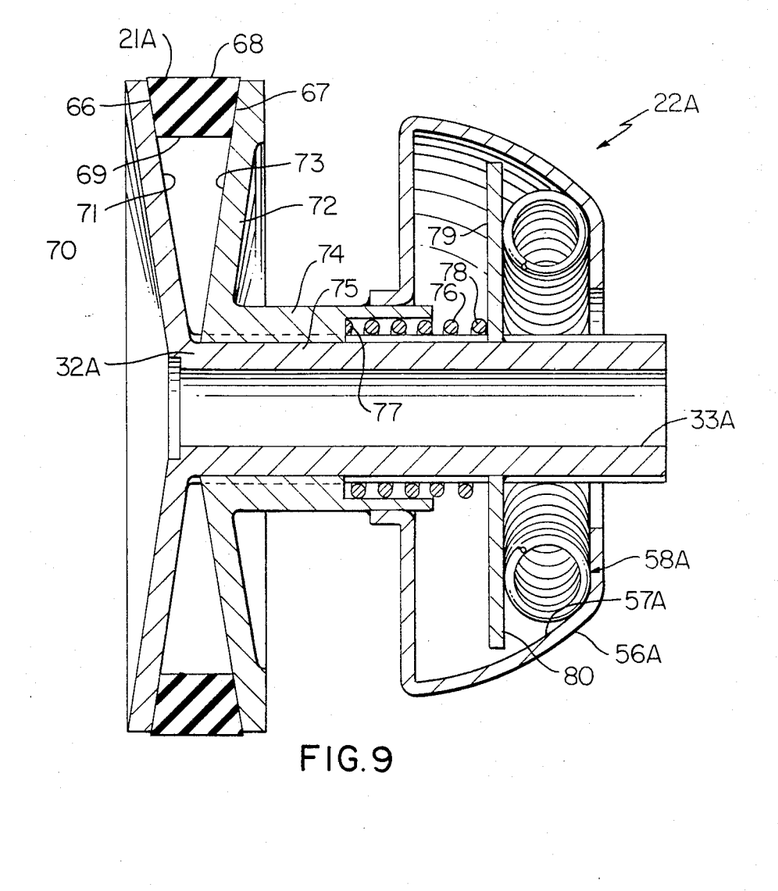
FIG. 9 is a cross-sectional view taken on line 9—9 of FIG. 8.
Figure 10:
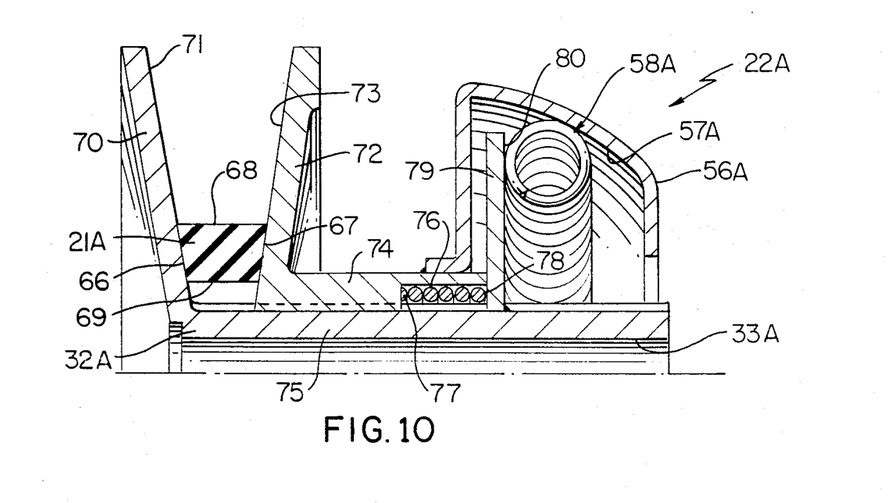
FIG. 10 is a partial view similar to FIG. 9 and illustrates the belt tensioner of FIG. 9 in another operating condition thereof.

As illustrated in FIGS. 7-10, the tensioner 22A of this invention is adapted to provide tension for a belt 21A that has angled opposed driving surfaces 66 and 67 that are disposed between the top and bottom surfaces 68 and 69 thereof whereby the belt construction 21A has a generally trapezoidal cross-sectional configuration as illustrated in FIGS. 7, 9 and 10 as is conventional for a V-belt construction.

The tensioner 22A of this invention includes a support means 32A adapted to be mounted on a drive or driven shaft by the opening 33A passing therethrough in a manner well known in the art and as previously described for the tensioner 22 so that the support means 32A will be fixed relative to the belt 21A and be rotated by the belt 21A or driving the belt 21A if the support member 32A is driven by a drive shaft as the case may be.

The support member 32A has an angled annular flange 70 that provides one sheave of the pulley 22A, the flange 70 having an angled surface 71 adapted to be disposed in engagement with the angled surface 66 of the belt 21A. A movable sheave 72 of the pulley 22A is splined to the support means 32A to move toward or away from the sheave 70 and has an angled surface 73 adapted to be disposed in driving relation with the side 67 of the belt 21A as illustrated in FIGS. 9 and 10.

The moveable sheave 72 has its tubular part 74 splined on a tubular part 75 of the support member 32A so as to rotate in unison with the support member 32A while being axially moveable relative to the sheave 70. The sheave 72 is normally urged toward the fixed sheave 70 by a compression spring 76 having one end 77 bearing against the tubular part 74 of the moveable sheave 72 and its other end 78 bearing against a plate 79 fixed to the tubular part 75 of the support member 32A whereby the force of the compression spring 76 urges the sheave 72 toward the sheave 70 to thereby provide a maximum effective diameter of the pulley or tensioner 22A as illustrated in FIG. 9.

The cam plate 56A is fixed to the tubular part 74 of the moveable sheave 72 and the centrifugal spring means 58A is disposed between the side 80 of the plate 79 and the cam surface 57A of the cam plate 56A so that as the centrifugal spring means 58A radially expands by the action of certain speeds of rotation of the pulley 22A, the centrifugal spring means 58A acts on the cam surface 57A of the cam plate 56A to urge the cam plate 56A to the right from the position illustrated in FIG. 9 in opposition to the force of the compression spring 76 and thereby moves the moveable sheave 72 away from the fixed sheave 70 to decrease the effective diameter of the pulley 22A as illustrated in FIG. 10.

Thus, it can be seen that the tensioner 22A can be formed from a relatively few parts by the method of this invention to operate in a manner now to be described.

When the engine 20 utilizing the belt 21A is being operated at low speeds, such as by the vehicle containing the engine 20 being moved between zero and ten miles per hour on a straight road, the speed of rotation of the pulley 22A in combination with the spring means 76 and 58A is such that the compression spring means 76 maintains the moveable sheave 72 to its closest position relative to the fixed sheave 70 so that the pulley 22A has its maximum effective diameter acting on the belt 21A to provide the maximum amount of tension on the belt 21A. However, as the speed of the engine 20 increases so as to move the vehicle at a speed progressively increasing from approximately ten miles per hour on a straight road, the speed of rotation of the tensioner 22A causes the centrifugal spring means 58A to progressively increase its diameter and thereby cam the cam plate 56A to the right in opposition to the force of the compression spring 76 to progressively move the moveable sheave 72 away from the fixed sheave 70 so that the effective diameter of the tensioner 22A progressively decreases from maximum amount illustrated in FIG. 9 to the minimum amount illustrated in FIG. 10 wherein the speed of the vehicle has reached a certain high speed of operation thereof, such as reaching a speed of movement of the vehicle of approximately fifty-five miles per hour for the reasons previously set forth. Of course, as the speed of the engine progressively decreases from the certain high speed thereof, the tensioner 22A will progressively increase its effective diameter so that at low speeds of operation of the belt 21A, the tensioner 22A will provide a greater tensioning force thereon than at high speeds of operation of the belt 21A whereby it is believed that the life of the belt means 21A will be extended by the tensioner 22A of this invention.

Therefore, it can be seen that the tensioner 22A of this invention comprises a support means 32A adapted to be fixed relative to the belt 21A, a belt engaging means 72 carried by the support means 32A and being moveable relative thereto, biasing means 76 operatively associated with the support means 32A and the belt engaging means 72 urging the belt engaging means 72 relative to the support means 32A in a belt tensioning direction against the belt 21A with a force to tension the belt 21A, and control means 58A operatively associated with the biasing means 76 to progressively decrease its urging force on the belt engaging means 72 as the speed of movement of the belt 21A progressively increases from a certain low speed of movement thereof to a certain high speed of movement thereof.

Accordingly, it can be seen that this invention not only provides an improved combination of a power transmission belt that is adapted to be operated in an endless path and a tensioner for the belt, but also this invention provides an improved method of operating such a combination and an improved method of making such a combination. In addition, this invention provides an improved tensioner for a power transmission belt that is adapted to be operated in an endless path and an improved method of making such a tensioner.

While the forms and methods of this invention now preferred have been illustrated and described as required by the Patent Statute, it is to be understood that other forms and method steps can be utilized and still fall within the scope of the appended claims.

What is claimed is:

1. In a combination of a power transmission belt that is adapted to be moved in an endless path and a tensioner for said belt, the method of making said combination comprising forming a variable speed pulley having a rotatable hub comprising a support means of said tensioner fixed relative to said belt, providing a belt engaging means carried by said support means and being moveable relative thereto, operatively associating biasing means with said support means and said belt engaging means to urge said belt engaging means relative to said support means in a belt tensioning direction and against said belt with a force to tension said belt, forming an endless flexible sleeve, placing said sleeve around said hub to form diameter defining means, disposing said biasing means between said hub and said diameter means, and operatively associating a control means with said biasing means to progressively decrease its urging force on said belt engaging means during operation of said belt as the speed of movement of said belt progressively increases from a certain low speed of movement thereof to a certain high speed of movement thereof.

2. A method as set forth in claim 1 and including the step of forming said tensioner to comprise a variable speed pulley that is adapted to progressively reduce its effective diameter as the speed of rotation thereof progressively increases from a certain low speed of rotation thereof to a certain high speed of rotation thereof.

3. A method as set forth in claim 1 and including the step of forming said biasing means to comprise a compression spring means.

4. A method as set forth in claim 1 and including the step of forming said diameter defining means to comprise means adapted to be engaged and rotated by a bottom driving surface of said belt.

5. A method as set forth in claim 1 and including the step of forming said control means of said pulley to comprise centrifugal means that is operatively associated with said biasing means to progressively reduce its urging force on said belt engaging means as said centrifugal means is rotated from said certain low speed of rotation thereof to said certain high speed of rotation thereof.

6. In a method of making a tensioner for a power transmission belt that is adapted to be moved in an endless path, said method comprising forming a variable speed pulley having a rotatable hub comprising a support means of said tensioner that is adapted to be fixed relative to said belt, providing a belt engaging means carried by said support means and being moveable relative thereto, operatively associating biasing means with said support means and said belt engaging means for urging said belt engaging means relative to said support means in a belt tensioning direction and against said belt with a force to tension said belt, forming an endless flexible sleeve, placing said sleeve around said hub to form diameter defining means, disposing said biasing means between said hub and said diameter defining means, and operatively associating a control means with said biasing means to progressively decrease its urging force on said belt engaging means during operation of said belt as the speed of movement of said belt progressively increases from a certain low speed of movement thereof to a certain high speed of movement thereof.

7. A method as set forth in claim 6 and including the step of forming said tensioner to comprise a variable speed pulley that is adapted to progressively reduce its effective diameter as the speed of rotation thereof progressively increases from a certain low speed of rotation thereof to a certain high speed of rotation thereof.

8. A method as set forth in claim 6 and including the step of forming said biasing means to comprise a compression spring.

9. A method as set forth in claim 6 and including the step of forming said diameter defining means to comprise means adapted to be engaged and rotated by a bottom driving surface of said belt.

10. A method as set forth in claim 6 and including the step of forming said control means of said pulley to comprise centrifugal means that is operatively associated with said biasing means to progressively reduce its urging force on said belt engaging means as said centrifugal means is rotated from said certain low speed of rotation thereof to said certain high speed of rotation thereof.

* * * * *